US008256287B2

(12) United States Patent (10) Patent No.: US 8,256,287 B2
Karmazyn (45) Date of Patent: Sep. 4, 2012

(54) SENSOR SHIELD RETENTION DEVICE AND SYSTEM

(75) Inventor: Michael J. Karmazyn, Sparrows Point, MD (US)

(73) Assignee: AAI Corporation, Hunt Valley, MD (US)

( * ) Notice: Subject to any disclaimer, the term of this patent is extended or adjusted under 35 U.S.C. 154(b) by 334 days.

(21) Appl. No.: 12/760,689

(22) Filed: Apr. 15, 2010

(65) Prior Publication Data

US 2010/0263444 A1 Oct. 21, 2010

Related U.S. Application Data

(60) Provisional application No. 61/169,653, filed on Apr. 15, 2009.

(51) Int. Cl.
*G01D 11/24* (2006.01)
*G01L 19/14* (2006.01)

(52) U.S. Cl. ........................................................ 73/431
(58) Field of Classification Search ..................... 73/431
See application file for complete search history.

(56) References Cited

U.S. PATENT DOCUMENTS

| | | | | |
|---|---|---|---|---|
| 4,343,185 | A * | 8/1982 | Knute | 374/158 |
| 6,957,564 | B2 * | 10/2005 | Nelson et al. | 73/23.31 |
| 7,415,891 | B2 * | 8/2008 | Santos et al. | 73/856 |
| 7,425,138 | B2 * | 9/2008 | Buhl et al. | 439/76.1 |
| 7,500,394 | B2 * | 3/2009 | Steele | 73/493 |
| 8,117,906 | B2 * | 2/2012 | Novak et al. | 73/114.71 |
| 2002/0040599 | A1 * | 4/2002 | Holleboom | 73/431 |
| 2007/0277605 | A1 * | 12/2007 | Fouts et al. | 73/431 |
| 2008/0282769 | A1 * | 11/2008 | Nelson | 73/23.31 |
| 2009/0056442 | A1 * | 3/2009 | Tokuhara | 73/431 |
| 2010/0263444 | A1 * | 10/2010 | Karmazyn | 73/431 |

* cited by examiner

*Primary Examiner* — Lisa Caputo
*Assistant Examiner* — Jamel Williams
(74) *Attorney, Agent, or Firm* — Venable LLP; Jeffri A. Kaminski; Todd R. Farnsworth (57) ABSTRACT

A system and device that provides for the retention of a sensor shield for a sensor such as a microphone, hydrometer, chemical sensor, or other detector. This invention provides for the quick attachment and release of a reduced visibility and reduced bulk shield retention assembly. In a battlefield environment, a smaller profile sensor shield presents less visibility as a prospective target of interest to enemy forces. Also, the sensor shield may be readily replaced without the use of any tools. The snap-lock feature provides a positive means for holding, for example, a windscreen in its respective position, requiring reasonable, but yet not objectionable force to install and remove the windscreen from the sensor's mounting shaft. Furthermore, the snap-lock feature, when engaged, may provide positive location of the sensor shield's sweet spot by maintaining a slight air space between the sensor shield and the sensor, and thereby precluding direct physical contact.

24 Claims, 9 Drawing Sheets

SENSOR SHIELD RETENTION DEVICE AND SYSTEM

PRIORITY DATA

This application claims the benefit of U.S. Provisional Application No. 61/169,653, filed Apr. 15, 2009, which is hereby incorporated by reference.

BACKGROUND

1. Field

Exemplary embodiments relate generally to sensor shields such as windscreens for microphones or other sensors.

2. Related Art

Working microphones and other sensitive equipment used in the field may require protection from the elements. For example, ultra-sensitive gunfire detection equipment, including the Projectile Detection and Cueing (PDCue®) Tetrahedral and Packbot designs, by AAI Corporation, include microphones which may desirably employ windscreens and analogous equipment.

These windscreens may employ mechanisms for attachment. For example, miniature setscrews may be used to attach the windscreens to microphone posts. Primary disadvantages of using such setscrews includes the fact that a relatively thick structure to hold the setscrew may be required, and a special tool may be needed when attaching and removing windscreens in the field. Such special tools are readily misplaced and may be difficult to obtain in certain remote areas, particularly in combat and other demanding conditions. Tiny setscrews are easily damaged, often lost, and may be difficult to replace in the field.

Some related technologies have made use of simple, plastic cable ties to hold the windscreens in place. An obvious disadvantage to using plastic cable ties in the field is their poor resistance to sunlight, unless the plastic is pigmented black, and/or ultraviolet inhibited. Furthermore, most plastic ties are not reusable, and have to be cut off and discarded when changing a windscreen. In addition, cable ties are only applicable to relatively narrow-shaped, elongated windscreens, since larger ball-shaped windscreens would have no such neck for the wire tie to readily attach. For example, although it may be feasible to manufacture a large ball-shaped windscreen having a narrow neck, such a windscreen would be cost prohibitive and highly wasteful of material, and would likely be manufactured in two pieces.

Spring-loaded ball lock devices are available to provide a snap-lock feature. However, ball locks are fairy expensive, and require substantial housings for proper installation. Furthermore, a ball lock by itself would not provide any positive over travel limit. A windscreen that is installed beyond its optimum sweet spot, may allow the windscreen material to physically touch the surface of the microphone. Should the windscreen touch the surface of the microphone, then unwanted noise could easily be generated, by inadvertent contact and rubbing of the two surfaces, especially under the influence of dynamic motion and/or windy conditions.

Finally, most windscreens on the market merely rely upon the frictional fit between the resilient windscreen material and the microphone to hold them in place. A frictional interface is not considered reliable when subjected to the external forces of high wind and rain, jolting over rugged terrain, or in the presence of rough handling environments such as inadvertent contact with foliage and brush when mounted on a moving vehicle, as expected in many military environments.

Furthermore, the use of frictional, drawstring, or cable tie type attachments do not provide a positive means to achieve axial location of the windscreen along the microphone's stem. Knowing that it is highly desirable for acoustic reasons to not bottom the windscreen directly against the microphone, as mentioned above, the lack of a positive positioning feature can be deleterious to the microphone's desired performance.

What is required is a method and system for quickly removing and attaching a windscreen used for a microphone that compensates for the above mentioned disadvantages and solves these problems, and improves the state of technology for windscreen retention generally.

SUMMARY

In an illustrative embodiment of the present invention, a shield retention device to isolate a sensor from direct impingement is disclosed. According to one embodiment, the shield retention device may include a base which may include multiple petals radially distributed around the base, where the petals may flex upon pressure and return to their original position on release when the pressure is released. Each petal may include a longitudinal shaft extending from the base to a petal stop, the longitudinal shaft has both a top and a bottom. The petals may also include one or more adhesive traps on the top of the longitudinal shaft. The petals may include an overtravel prevention member and an apex cam member on the bottom of the longitudinal shaft. The shield retention device may include a sensor mounting shaft which may receive the petals. The sensor mounting shaft may include the sensor to be isolated from direct impingement and a raised boss.

In another illustrative embodiment of the present invention, a sensor enhancement system is disclosed. According to one embodiment, the sensor enhancement system may include a mounting shaft. The mounting shaft may include a raised boss with an on-ramp and an off-ramp, and the mounting shaft may have an attached sensor. The sensor enhancement system may also include a shield which to isolate the sensor from direct impingement, a gap between the sensor and the shield, and a shield retention device. The shield retention device may include a mechanism to couple the shield to the shield retention device and latches that flex upon pressure and return to original position on release of the pressure. The latches may be separated by multiple longitudinal slits. The latches may include an apex cam member which may, with force, slide over the raised boss via the on-ramp and snap-lock the shield into position creating the gap. The apex cam member may, with another force, slide over the raised boss via the off-ramp to disengage the shield retention device from the mounting shaft. The latches may also include an overtravel prevention member which may prevent the shield retention device from further travel along the mounting shaft.

In another illustrative embodiment of the present invention, a shield retention device is disclosed. According to one embodiment, a shield retention device may include a hollow body which has a first end and a second end, where longitudinal slits may extend from the first end to the second end, these longitudinal slits define petals which may radiate around the body. The petals may flex on pressure and return to original position upon release of the pressure. The petals may include petal stops, a shield bonding mechanism, an overtravel prevention member, and an apex cam member.

Further features and advantages of, as well as the structure and operation of, various embodiments, are described in detail below with reference to the accompanying drawings.

BRIEF DESCRIPTION OF THE DRAWINGS

The foregoing and other features and advantages of the invention will be apparent from the following, more particular description of exemplary embodiments of the invention, as illustrated in the accompanying drawings. In the drawings, like reference numbers generally indicate identical, functionally similar, and/or structurally similar elements. The drawing in which an element first appears is indicated by the leftmost digits in the corresponding reference number. A preferred exemplary embodiment is discussed below in the detailed description of the following drawings.

DETAILED DESCRIPTION OF EXEMPLARY EMBODIMENTS OF THE PRESENT INVENTION

Various exemplary embodiments are discussed in detail below including a preferred embodiment. While specific implementations are discussed, it should be understood that this is done for illustration purposes only. A person skilled in the relevant art can recognize that the systems, methods and features provided herein may be used without parting from the spirit and scope of the invention. Furthermore, any and all references cited herein shall be incorporated herein by reference in their respective entireties.

Figure 1:
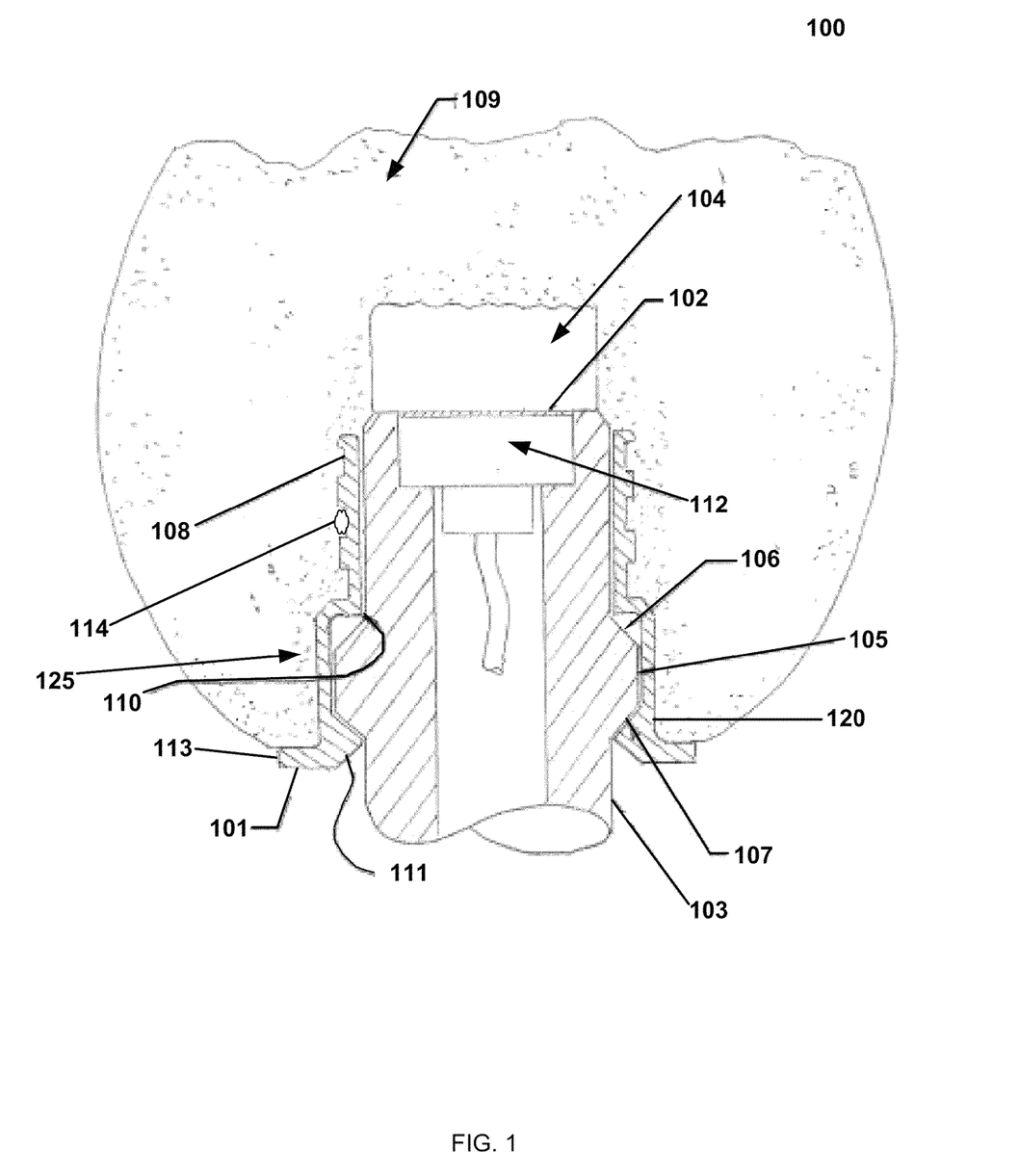
FIG. 1 depicts an exemplary diagram showing many of the key elements of the invention in accordance with exemplary embodiments.

FIG. 1 (view 100) depicts an exemplary embodiment of the invention in one configuration. Item 112, a sensor or detector, such as, but not limited to, a microphone, temperature sensor, humidity sensor, smoke detector, gas detector, seismometer, Geiger counter, chemical sensor, etc., is typically mounted on the nose of a sensor mounting shaft, item 103. The sensor may have, for example, a metallic screen attached to its face, item 102. The sensor, item 112, may be protected from direct impingement (e.g., noise, dust, sunlight, etc.) by a sensor shield, item 109. The sensor shield, item 109, may include a variety of sensor or detector protection material, such as, but not limited to, a windscreen, dust shield, sunshield, blimp, pop filter, cage, basket, etc.

In an exemplary embodiment, the sensor, item 102, may never directly contact the sensor shield, item 109. To avoid unwanted interference being generated by physical contact between the sensor, item 112, and the sensor shield, item 109, the sensor, item 112, and the sensor shield, item 109, may be separated by a gap, item 104, such as dead air space. The establishment and maintenance of this gap, item 104, may be better known as the sweet spot, item 104.

In an exemplary embodiment, the sweet spot, item 104, is established and maintained by positioning the sensor shield, item 109, in such a way to lock the sensor shield, item 109, onto a raised boss, item 105, thereby holding the sensor shield, item 109, in the desired sweet spot location, item 104. In order to achieve this, a mechanical mechanism is created by virtue of a snap-lock device, item 101, also called the shield retention assembly. The working portion of the snap-lock device, item 101, is at the base of petals, item 125, where, for example, two 45 degree angles converge to form an apex, item 111.

In an exemplary embodiment, with sufficient force, apex, item 111, begins traveling along the sensor mounting shaft, item 103, and over the raised boss, item 105, by traveling the on-ramp, item 106 and over the raised boss, item 105, and the off-ramp, item 107. Once the over-travel prevention feature, item 110, strikes the on-ramp, item 106, it may prevent the snap-lock device, item 101, from further travel along the sensor mounting shaft, item 103. Once the apex, item 111, travels over the raised boss, item 105, the off-ramp, item 107, prevents the reverse travel of the snap-lock device, item 101, without sufficient force to overcome the resistance between the apex, item 111 and the off-ramp 107.

In an exemplary embodiment, the mating circular cavity, item 120, of sensor shield, item 109, may initially slide onto shield retention assembly, item 101, and proper sensor shield, item 109, placement may be complete when sensor shield, item 109, is seated flush against the petal stops, item 113. Sensor shield, item 109, may be coupled to the snap-lock device, item 101, through the use of an adhesive, item 114, (e.g., but not limited to an epoxy, cement, resin, glue, etc.) or through mechanical means such as a fastener (e.g., but not limited to, a rivet, clasp, bolt, nail, screw, staple, etc.). To facilitate bonding between the snap-lock device, item 101, and sensor shield, item 109, grooves on the snap-lock device, shown as item 108, may be used to hold an adhesive, a bonding agent, or a bonding mechanism. The groves, item 108, may be on the top of the petals, item 125, while the apex, item 111, and over travel prevention feature, item 110, is on the bottom of the petals, item 125.

Figure 2:
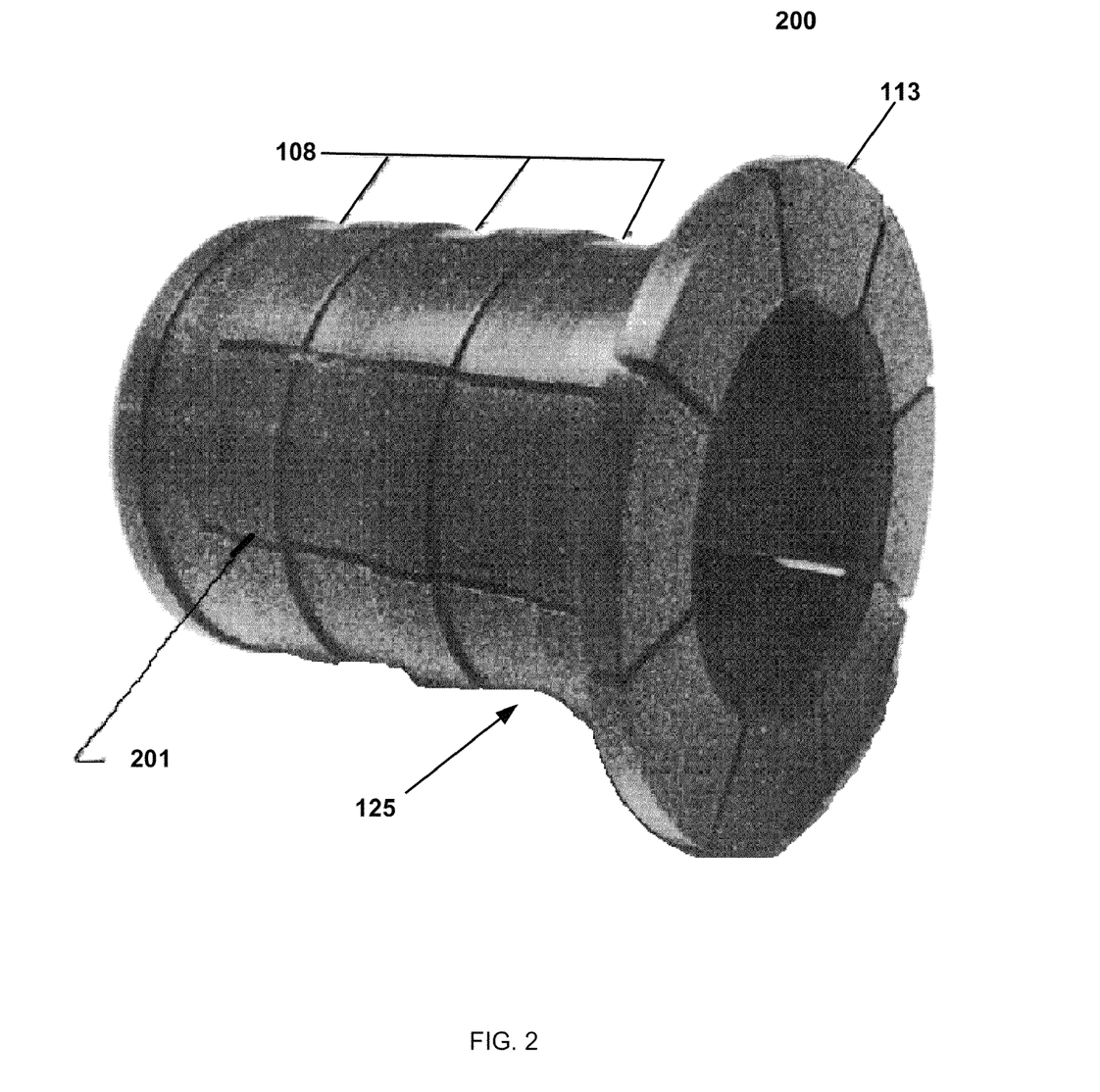
FIG. 2 depicts an exemplary diagram of the plastic snap-lock device, depicting the adhesive trap features, the longitudinal slits that form the flex petal regions, and the petal stops which act to limit the snap-lock when inserting into a sensor shield in accordance with exemplary embodiments.

FIG. 2 (view 200) depicts an exemplary embodiment of the basic snap-lock device configuration. In an exemplary embodiment, a series of longitudinal slits, item 201, are fashioned in the body for some distance, in order to create petals, item 125, that can readily be induced to flex. In an exemplary embodiment, the length of the slits, item 201, and the number of petals, item 125, may control the force necessary to induce flexure on the snap-lock feature. The longer the slit, item 201, and the more petals, item 125, the easier it is to induce flexure, and vise versa. In an exemplary embodiment, the particular type of material, along with the thickness of the material can also affect the amount of force to induce flexure.

The exemplary embodiment in FIG. 2 also depicts a series of radial-spaced grooves, item 108, on the outside diameter of the snap-lock device, item 101. In one embodiment, these grooves, item 108, form zones for an adhesive, for example, to be trapped in when the snap-lock device, item 101, is bonded to the sensor shield, item 109. For example, strips of adhesive can be placed on the exterior of each snap-lock petal, item 125, and then the snap-lock device, item 101, can be rotated, and progressively slid into the mating circular cavity, item 120, on the sensor shield, item 109, until seated against the petal stops, item 113.

Figure 3:
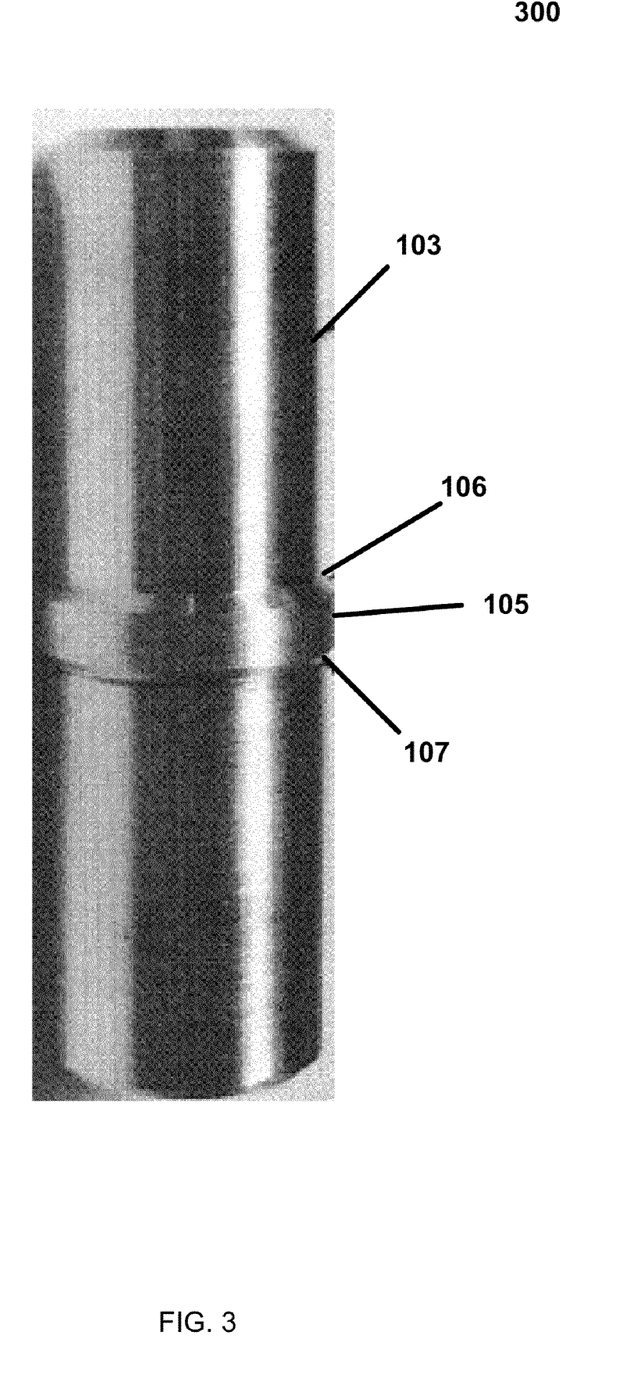
FIG. 3 depicts an exemplary diagram of a typical snap-lock device (without an attached sensor shield), and a sample sensor mounting shaft with integral raised boss and ramps in accordance with exemplary embodiments.

FIG. 3 (view 300) depicts an exemplary embodiment of the sensor's mounting shaft, item 103. The sensor's mounting shaft, for example, has a raised boss area, item 105. Forward of this raised boss, there is a ramp angled at, in one exemplary embodiment 45 degrees, the on ramp, labeled 106. Aft of the raised boss feature is a second ramp, the off ramp, item 107, which may be angled at 45 degrees, for example.

Figure 4:
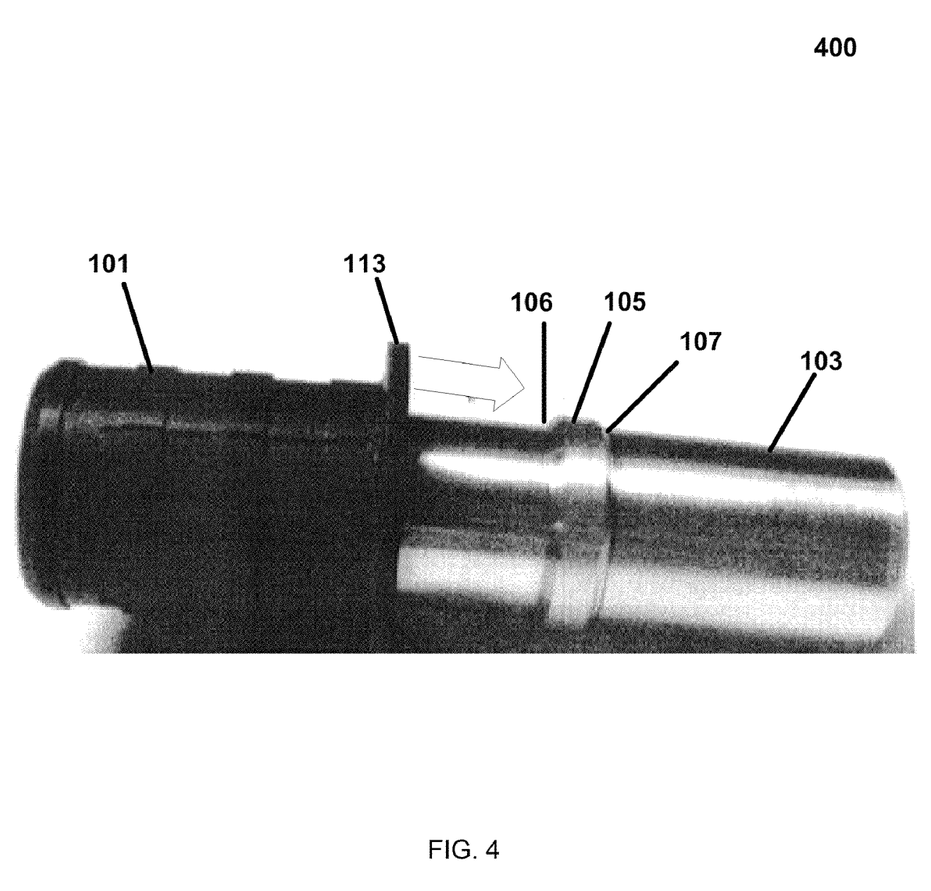
FIG. 4 depicts an exemplary diagram of the snap-lock device sliding over the tip of the sensor's mounting shaft an in accordance with exemplary embodiments.

FIG. 4 (view 400) depicts an exemplary embodiment of the snap-lock device, item 101 (in the illustrated embodiment without the attached sensor shield, item 109) sliding over the tip of the sensor's shaft, item 103. The working portion of the snap-lock, item 101, is at the base of the petals, item 125, where, for example, two 45 degree angles converge to form the apex, item 111. In an exemplary embodiment, pushing the shield retention assembly toward the raised boss, item 105, on the shaft will cause the snap-on feature to engage. When the apex reaches the on ramp, item 106, the radial petals, item 125, may spring outward to ride up the ramp, and then glide across the flat portion of the raised boss, item 105, and then finally spring back inward to latch down upon the off ramp, item 107, thereby snapping into, and establishing the sweet spot position.

Figure 5:
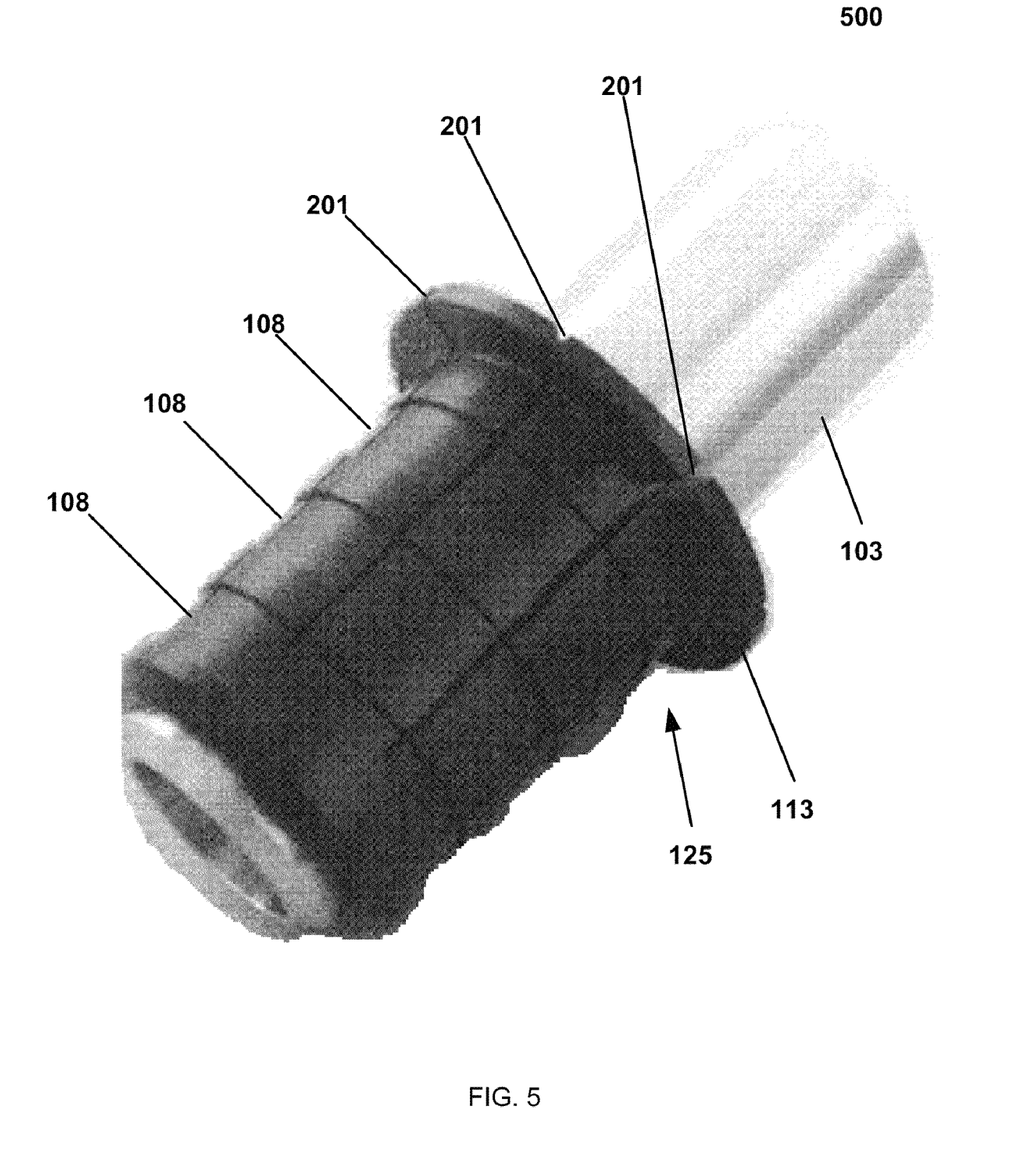
FIG. 5 depicts an exemplary diagram of the snap-lock device fully snapped into position on the sensor's mounting shaft in accordance with exemplary embodiments.

FIG. 5 (view 500) depicts an exemplary embodiment of the snap-lock device, item 101, (without the attached sensor shield, item 109) fully snapped into position on the microphone shaft in accordance with exemplary embodiments. In this exemplary embodiment, the snap-lock device, item 101, is mated to the raised boss, item 105, on the sensor's mounting shaft, item 103. The over travel prevention member, item 110, on the snap-lock feature resists riding up the angle of the on ramp, item 106. In an exemplary embodiment, the over travel prevention member, item 110, may, for example, be angled at 90 degrees. The over travel prevention feature prevents the sensor shield from inadvertent over travel from the established sweet spot, item 104. In one exemplary embodiment, to disengage the snap-lock, the functions occur in reverse. For example, pulling on the shield retention assembly, item 101, with sufficient force, will result in the apex riding up the off ramp, item 107, gliding over the raised boss, and then traversing the on ramp to fully separate from the sensor's shaft, item 103.

Figure 6:
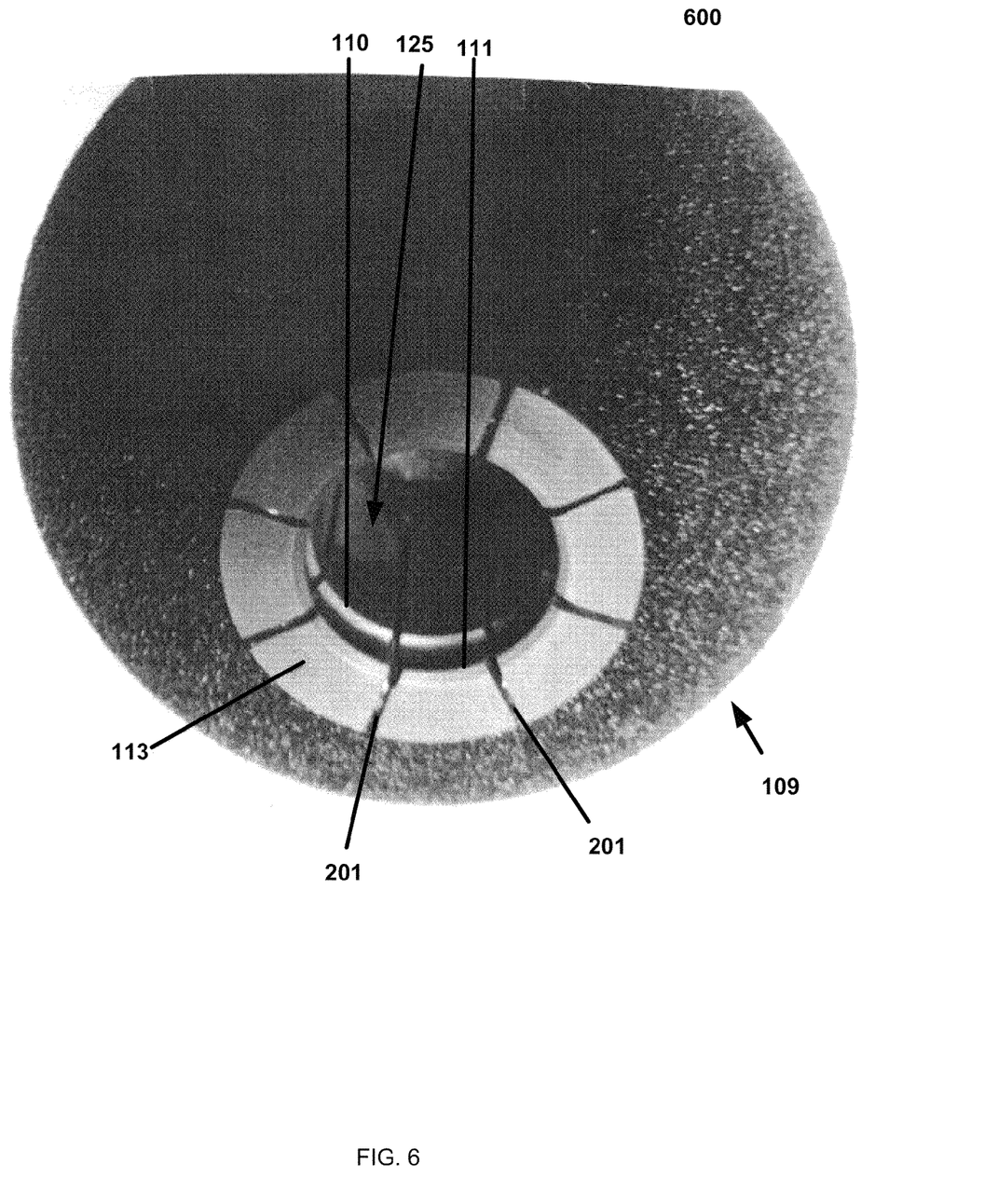
FIG. 6 depicts an exemplary diagram of the snap-lock device bonded to a foam windscreen acting as a sensor shield in accordance with exemplary embodiments.

FIG. 6 (view 600) depicts an exemplary embodiment of the snap-lock device, item 101, bonded to a sensor shield, item 109, such as a foam windscreen. As shown previously, in an exemplary embodiment, a series of longitudinal slits, item 201, can be seen and may be fashioned in the body for some distance, in order to create petals, item 125, that can readily be induced to flex. The exemplary item 113, shows an embodiment of petal stops that restrict further movement of the windscreen thereby ensuring the proper amount of sweet spot, item 104, between the sensor shield, item 109, and the sensor, item 112.

Figure 7:
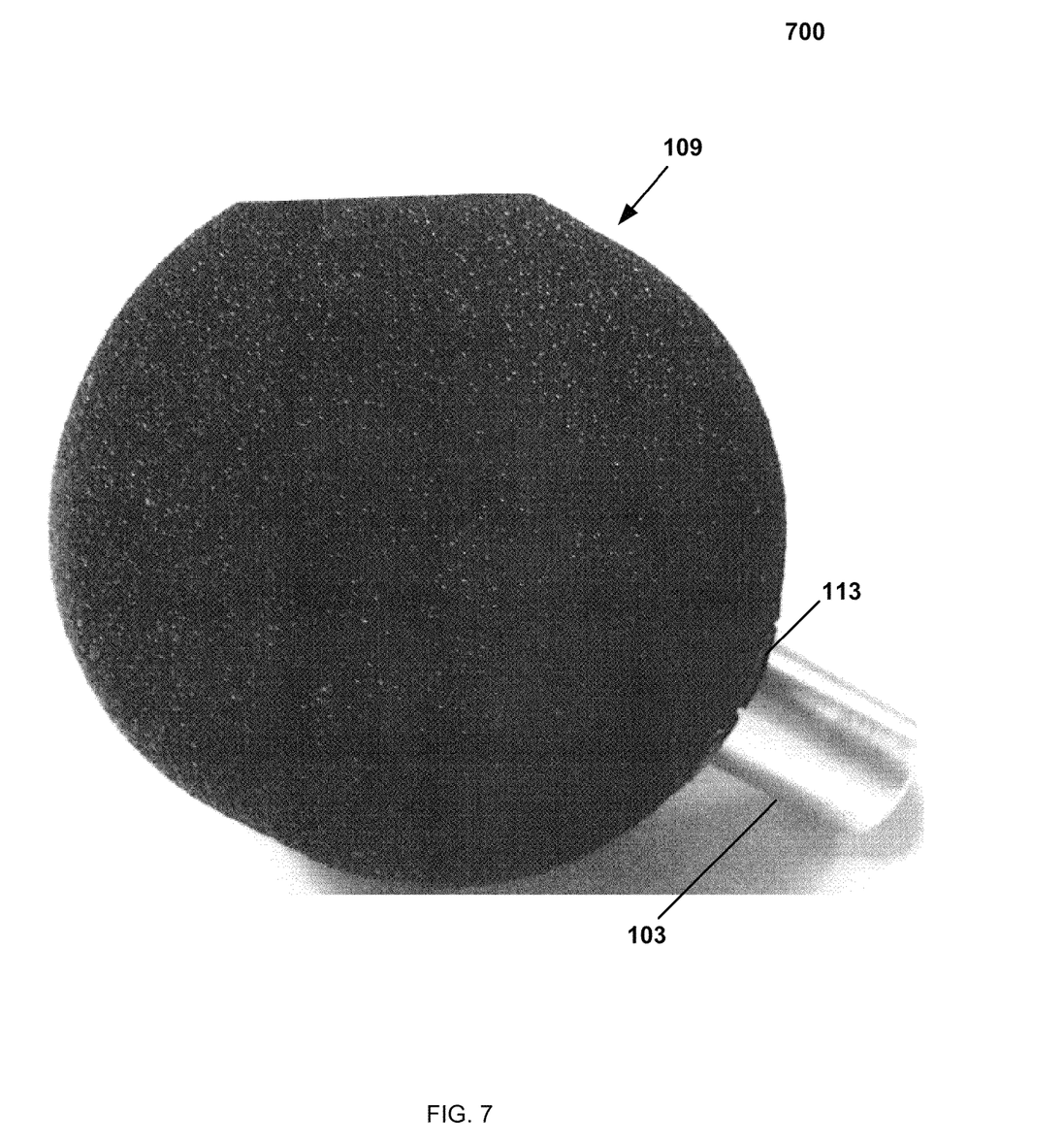
FIG. 7 depicts an exemplary diagram of a bonded foam windscreen as a sensor shield that has been slid fully into position on the sensor's mounting shaft in accordance with exemplary embodiments.

FIG. 7 (view 700) depicts an exemplary embodiment of a bonded sensor shield, item 109, slid fully into position on the sensor's mounting shaft, item 103. In this embodiment, the snap-lock device, item 101, is bonded to the sensor shield, item 109, and the snap-lock device, item 101, is held to the raised boss, item 105, on the sensor's mounting shaft, item 103, which maintains the desired sweet spot, item 104.

Figure 8:
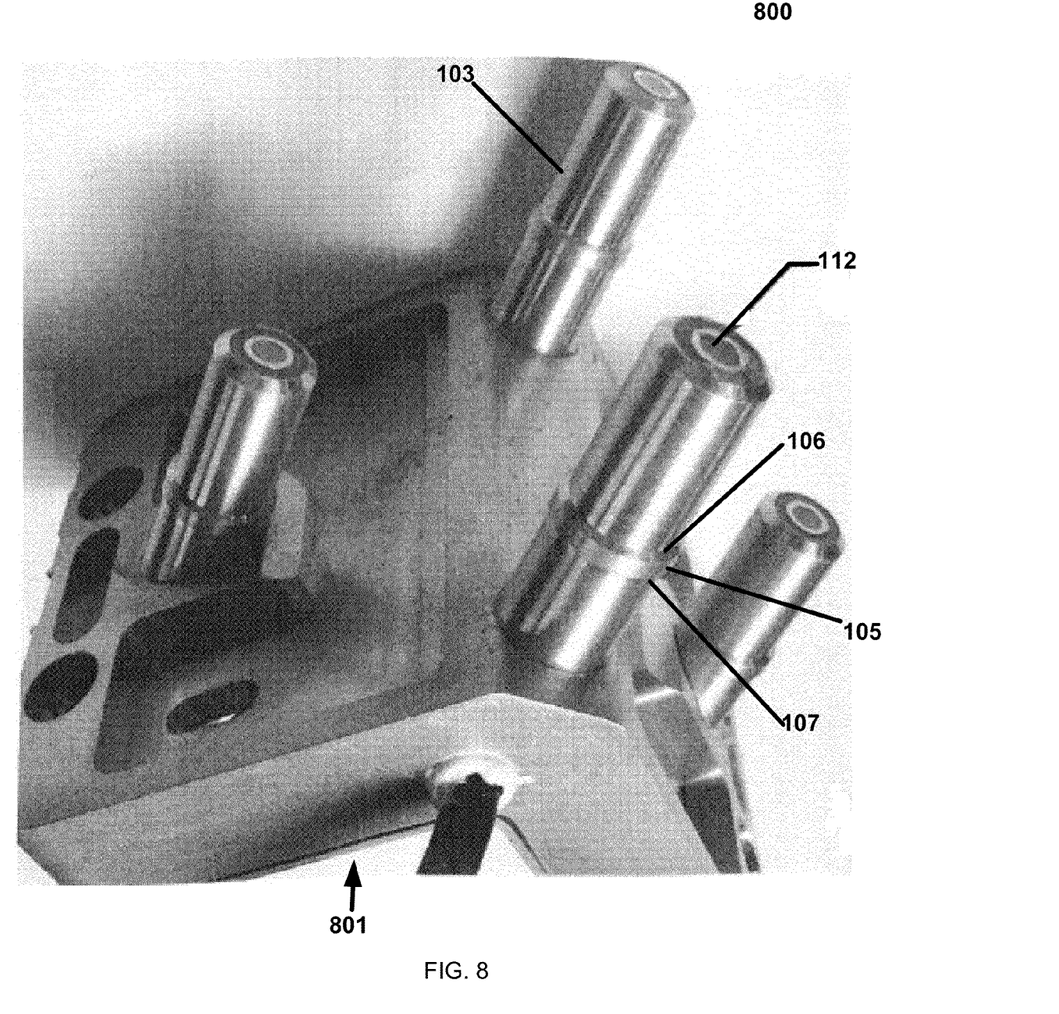
FIG. 8 depicts an exemplary diagram of a multi sensor array, typical to that used in acoustic detection for the military by AAI Corporation. The array shows four sensors assembled to their respective sensor mounting shafts, with each sensor mounting shaft having an integral raised boss including "on" and "off" ramp features in accordance with exemplary embodiments.

FIG. 8 (view 800) depicts an exemplary embodiment of a multi sensor, item 112, sensor array, item 801, typical to that used in acoustic detection by the military. The array shows four sensors (e.g., but not limited to microphones), item 112, assembled to their respective sensor mounting shafts, item 103, with each shaft having an integral raised boss, item 105, including on ramp, item 106, and off ramp, item 107, features.

Figure 9:
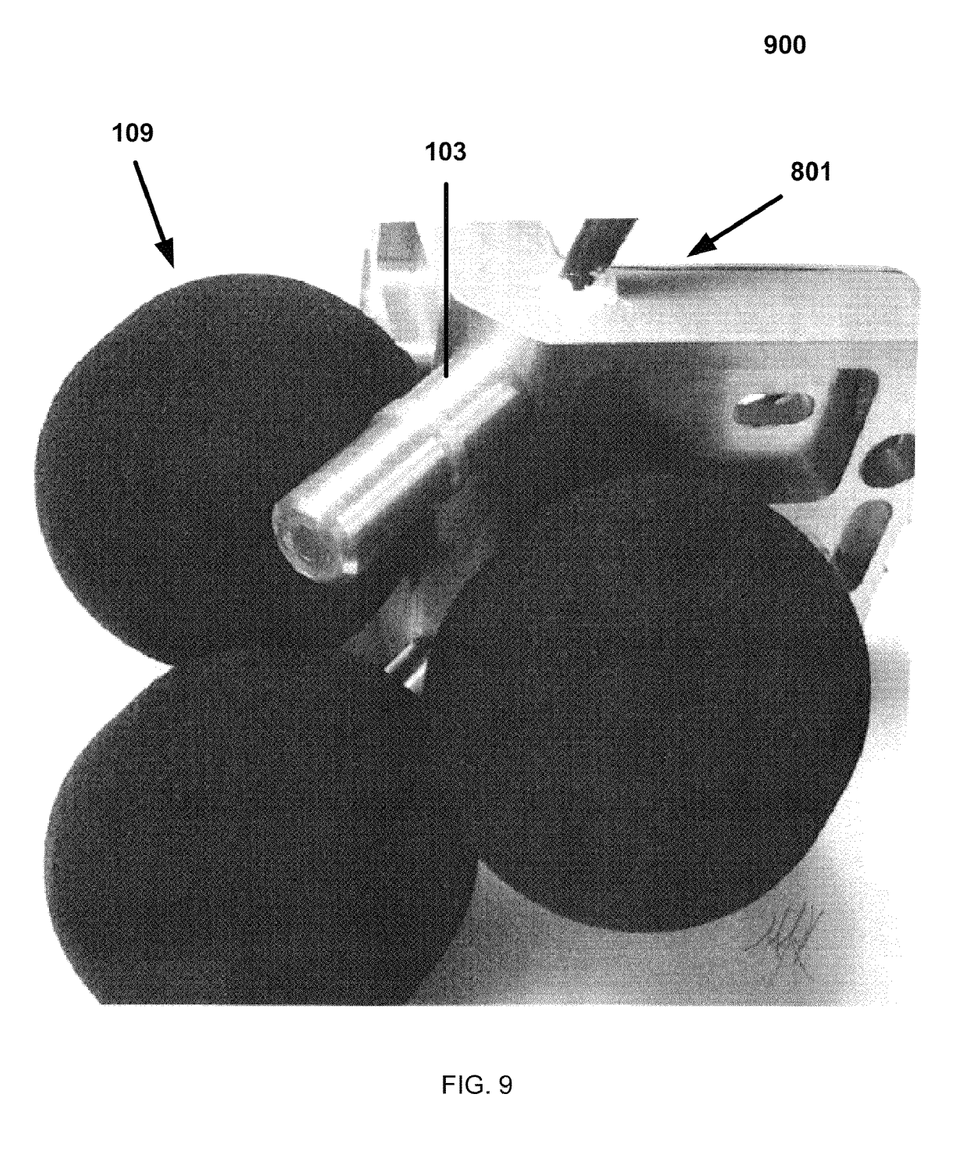
FIG. 9 depicts an exemplary diagram of the four sensor array, now having three of the four sensor shields attached utilizing the snap-lock sensor shield retention and positioning device in accordance with exemplary embodiments.

FIG. 9 (view 900) depicts an exemplary embodiment of the four sensor array, item 801, now having three of the four sensor shields, item 109, attached utilizing the snap-lock device, item 101, which correctly positions the sensor shields, item 109, to ensure the correct sweet spot, item 104.

In one embodiment, the quick attach and quick release shield retention assembly, item 101, may be less visible than the bulky windscreen. In a battlefield environment, a smaller profile windscreen, for example, presents less visibility as a prospective target of interest to enemy forces. Also, the sensor shield, item 109, may be readily replaced without the use of any tools. The snap-lock feature provides, for example, a positive means for holding the sensor shield in its respective position, requiring reasonable, but yet not objectionable force to install and remove the sensor shield from the sensor's mounting shaft. Furthermore, the snap-lock feature, when engaged, provides positive location of the sensor shield's sweet spot by maintaining a slight air space between the sensor shield and the sensor, and thereby precluding direct physical contact.

In another embodiment, the quick attach and quick release shield retention assembly, item 101, may provide an integral means to prevent inadvertent over travel of the sensor shield, item 109, when installed onto the sensor's mounting shaft, item 103. An additional advantage is to achieve all of the desired features with as few parts as possible, for reasons of simplicity, reliability, maintenance, and cost reduction. The quick attach and quick release shield retention assembly, item 101, may provide, for example, a structural interface between the sensor shield, such as the foam portion on a foam windscreen, and the sensor's mounting shaft. By, for example, providing a series of concentric undercuts on the exterior of the snap-lock device, adhesive may be conveniently captured without readily being wiped off during assembly. This may allow for the sensor shield to be structurally bonded to the snap-lock device.

The integral, quick attach and quick release sensor shield retention device may provide a simple means for positive engagement, and precise positioning when installed onto the mating sensor mounting shaft, unlike the unreliable methods of prior art which rely on merely eye-balling the position of the sensor shield with respect to the sensor. Even if other methods are employed to provide a means of snap-lock, or positive stops to assure sensor shield location of the sensor, such devices incorporate many parts such as a complex ball-lock assembly, or expensive machining of tapped holes, counterbored locating surfaces, and the like in order to achieve a similar result. In one embodiment, a one-piece sensor shield retention device may utilize a series of equally spaced, double-faced latching surfaces that may work in unison to provide for discrete engagement, disengagement, and furthermore secure positive retention of the sensor's sweet spot position when sliding the sensor shield onto the sensor's mounting shaft that houses the sensor. Further, the radial petals, item 125, may be uniquely configured to spring out and then back again in order to snap-lock the sensor shield into its desired location. This radial latching array provides the necessary spring-like, lock-on resistance which holds the sensor shield in place when installed over the mating raised boss projection on the sensor's mounting shaft. Furthermore, the spacing, length, height, and the number of flexing petals, item 125, may act to tune the desired force required to both engage and disengage the sensor shield from its snap-lock, stopped position.

The use of a radial pattern of multiple, double-faced latches, with the radial latches acting in unison with an integral stop feature prevents inadvertent over travel of the sensor shield from its desired sweet spot.

In one exemplary embodiment, the snap-lock device, item 101, demonstrates desirable function in temperature excursions up to +160 degrees Fahrenheit, using 0.090 inch thick chlorinated polyvinyl chloride plastic (CPVC), and also with black polycarbonate plastic. Although the embodiments shown in FIG. 2 use a plastic material to fabricate the snap-lock mechanism, other materials, such as metals and composites may be used to achieve a similar function.

In another exemplary embodiment, the on ramp, item 106, and off ramp, item 107, may be set at 45 degrees to the sensor mounting shaft, item 103. Additionally, the on ramp, item 106, and off ramp, item 107, may be set at other angles to produce differing amounts of resistance. Also, in an exemplary embodiment the raised boss as shown in exemplary FIG. 3, item 105, may be set at approximately 0.040 inches high, though other heights will produce more or less engagement of the snap-lock feature.

For joining a sensor shield, item 109, such as a foam windscreen, to the plastic Snap-lock device, item 101, a variety of fairly resilient adhesives, bonding agents, or mechanical fasteners may be used. In an exemplary embodiment, flexibility, UV resistance and/or waterproof materials may be used for necessary attributes and/or superior performance. For example, in an exemplary embodiment UV6800 Marine Adhesive, provided by Eclectic Products, Inc., may be used. In an exemplary embodiment where adhesive has been used and is fully cured, it may be helpful to insure no adhesive remains between the slits by using, for example, a small razor knife, which may be inserted into each of the slits, item 201, between the respective petals, item 125, to assure free flexure of the petals, item 125, when expanded over the raised boss, item 105, of the sensor's mounting shaft, item 103.

In an exemplary embodiment, the snap-lock device, item 101, and the accompanying sensor shaft, item 103, may be sized up or down in diameter, and the length of the device may also be tuned as desired, for example, without taking away from the basic concept of operation. Such variations are anticipated, along with others discussed above.

Other applications are anticipated to be capable of utilizing the snap-lock device in a similar fashion.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A shield retention device to isolate a sensor from direct impingement, said device comprising:
    a base including a plurality of petals radially distributed around said base, wherein said plurality of petals are operable to flex upon pressure and return to original position on release of said pressure, each of said plurality of petals comprises:
        a longitudinal shaft extending from said base to a petal stop, said longitudinal shaft having a top and a bottom;
        one or more adhesive traps on the top of said longitudinal shaft;
        an overtravel prevention member on the bottom of said longitudinal shaft; and
        an apex cam member on the bottom of said longitudinal shaft; and
    a sensor mounting shaft operable to receive said plurality of petals, said sensor mounting shaft comprising:
        said sensor; and
        a raised boss.

2. The device of claim 1, wherein said plurality of petals are equally spaced apart from each other.

3. The device of claim 1, wherein said base and said plurality of petals are manufactured from one of chlorinated polyvinyl chloride (CPVC) plastic or black polycarbonate plastic.

4. The device of claim 1, wherein said sensor comprises one of:
    a microphone;
    a temperature sensor;
    a hygrometer; or
    a chemical sensor.

5. The device of claim 1, wherein said shield comprises one of:
    an acoustic windscreen;
    a sunshield; or
    a dust protector.

6. The device of claim 1, wherein said base and said plurality of petals comprises a single piece of material.

7. The device of claim 1, wherein said plurality of petals couples to said mounting shaft creating a sweet spot between said shield and said sensor.

8. The device of claim 1, wherein said shield is structurally bonded to said plurality of petals via an adhesive placed in said adhesive traps.

9. The device of claim 8, wherein said plurality of petals is operable to travel along said mounting shaft.

10. The device of claim 9, wherein said apex cam member travels over said raised boss and snap-locks said shield into a position on said mounting shaft.

11. The device of claim 10, wherein said overtravel prevention member prevents said plurality of petals from further travel in one direction along said mounting shaft.

12. The device of claim 1, wherein said apex cam member comprises two converging 45 degree angles.

13. A sensor enhancement system comprising:
    a mounting shaft comprising a raised boss, said raised boss comprising an on-ramp and an off-ramp;
    a sensor coupled to said mounting shaft;
    a shield operable to isolate said sensor from direct impingement;
    a gap between said sensor and said shield; and
    a shield retention device, said shield retention device comprising:
        a coupling mechanism to couple said shield to said shield retention device; and
        a plurality of latches operable to flex upon pressure and return to original position on release of said pressure, said latches separated by a plurality of longitudinal slits, said latches comprising:
            an apex cam member operable upon a first force to slide over said raised boss via said on-ramp and snap-lock said shield into a position creating said gap, said apex cam member operable upon a second force to slide over said raised boss via said off-ramp to disengage said shield retention device from said mounting shaft; and an overtravel prevention member operable to prevent, upon said first force, said shield retention device from further travel in one direction along said mounting shaft.

14. The sensor enhancement system of claim 13, wherein said shield retention device prevents said shield from contacting said sensor.

15. The sensor enhancement system of claim 13, wherein said gap comprises an air gap.

16. The sensor enhancement system of claim 13, wherein said plurality of flexible, radial, double faced latches are equally spaced apart from each other.

17. The sensor enhancement system of claim 13, wherein said shield retention device comprises one of chlorinated polyvinyl chloride (CPVC) plastic or black polycarbonate plastic.

18. The sensor enhancement system of claim 13, wherein said sensor comprises one of:
    a microphone;
    a temperature sensor;
    a hygrometer; or
    a chemical sensor.

19. The sensor enhancement system of claim 13, wherein said shield comprises one of:
    an acoustic windscreen;
    a sunshield; or
    a dust protector.

20. The sensor enhancement system of claim 13, wherein said shield retention device comprises a single piece of material.

21. The sensor enhancement system of claim 13, wherein said shield retention device further comprises petal stops operable to provide proper placement of said shield on said shield retention device.

22. The sensor enhancement system of claim 13, wherein said apex cam member comprises two converging 45 degree angles.

23. The sensor enhancement system of claim 13, wherein said on-ramp and said off-ramp are set at 45 degree angles to said mounting shaft.

24. A shield retention device comprising:
    a hollow body having a first end and a second end, wherein longitudinal slits extend from the first end to the second end defining petals radiating around the body, wherein said petals flex on pressure and return to original position upon release of said pressure, each of said petals comprise:
    a petal stop;
    a shield bonding mechanism;
    an overtravel prevention member; and
    an apex cam member.

* * * * *